US012803370B2

(12) United States Patent
Lee et al.

(10) Patent No.: US 12,803,370 B2
(45) Date of Patent: Nov. 17, 2026

(54) DEVICE FOR COOLING MOTOR

(71) Applicants: Hyundai Motor Company, Seoul (KR); Kia Corporation, Seoul (KR)

(72) Inventors: Jae Hyeon Lee, Bucheon-si (KR); Byung Woo Moon, Anyang-si (KR); Jeong Bin Yim, Incheon (KR); Young Jin Shin, Changwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 179 days.

(21) Appl. No.: 18/915,986

(22) Filed: Oct. 15, 2024

(65) Prior Publication Data

US 2025/0293565 A1 Sep. 18, 2025

(30) Foreign Application Priority Data

Mar. 15, 2024 (KR) ........................ 10-2024-0036129

(51) Int. Cl.
*H02K 5/20* (2006.01)
*H02K 9/19* (2006.01)

(52) U.S. Cl.
CPC ............... *H02K 5/203* (2021.01); *H02K 9/19* (2013.01)

(58) Field of Classification Search
CPC .......... H02K 5/203; H02K 9/19; H02K 9/197; H02K 9/00; H02K 9/08; H02K 9/193; H02K 9/20; H02K 9/14; H02K 9/10; H02K 9/16; H02K 9/18; H02K 9/12
See application file for complete search history.

(56) References Cited

U.S. PATENT DOCUMENTS

2009/0121562 A1* 5/2009 Yim ........................ H02K 9/193 903/906
2021/0226487 A1* 7/2021 Lim ......................... H02K 3/24

* cited by examiner

*Primary Examiner* — Naishadh N Desai
(74) *Attorney, Agent, or Firm* — Slater Matsil, LLP

(57) ABSTRACT

An embodiment device for cooling a motor includes a motor housing including an oil supply hole, a stator core disposed within the motor housing and including a cooling channel in communication with the oil supply hole, a stator coil wound on the stator core, cooling jackets each having an inner side portion defining therein an oil fill space into which a corresponding one of opposite end portions of the stator coil is inserted, wherein the cooling jackets are tightly coupled to opposite side portions of the motor housing and opposite side portions of the stator core, respectively, and spray structures respectively disposed in upper portions of the oil fill spaces in the cooling jackets, each spray structure being configured to spray oil flowing into the spray structure from the cooling channel toward the corresponding one of the opposite end portions of the stator coil.

15 Claims, 8 Drawing Sheets

DEVICE FOR COOLING MOTOR

CROSS-REFERENCE TO RELATED APPLICATIONS

This application claims the benefit of Korean Patent Application No. 10-2024-0036129, filed on Mar. 15, 2024, which application is hereby incorporated herein by reference.

TECHNICAL FIELD

The present disclosure relates to a motor cooling device.

BACKGROUND

An eco-friendly vehicle, such as a hybrid electric vehicle (HEV), a plug-in hybrid electric vehicle (PHEV), an electric vehicle (EV), and a fuel cell electric vehicle (FCEV), is equipped with a motor for travelling and regenerative braking.

Generally, it is known that the motor has an efficiency of about 90% and the remaining efficiency is lost due to heat, wind, sound, etc.

Heat loss from the motor increases the temperature of the motor, causing a motor system to exceed an allowable temperature, i.e., causing burnout of a motor coil due to over temperature and causing the motor system to exceed a reference temperature, which is a temperature to prevent demagnetization of a permanent magnet, and eventually causing a decrease in motor efficiency and durability.

For this reason, in order to allow the motor to operate within the allowable temperature and to improve cooling performance of the motor according to the demand for higher motor performance, an appropriate motor cooling system should be installed in an eco-friendly vehicle.

To this end, a direct motor cooling system configured to cool the motor by directly spraying oil onto the motor is mostly used, and the direct motor cooling system includes a motor controller, an electric oil pump, a heat exchanger, etc.

In the direct motor cooling system, the motor may be directly cooled by processes such as determining, by the motor controller, the rotation amount of the electric oil pump (EOP) in consideration of the current temperature of the motor (e.g., the temperature of the motor coil) and the temperature of oil and then applying an operation control signal to the electric oil pump, determining the amount of oil supplied to the motor by operating the electric oil pump according to the operation control signal from the motor controller, performing heat exchange between oil pumped from the electric oil pump and the heat exchanger, and directly supplying the oil whose temperature has been decreased through the heat exchange with the heat exchanger to a portion of the motor that needs to be cooled (e.g., a stator coil and a stator core).

Meanwhile, the motor includes a motor housing having formed therein an oil supply hole, a stator core provided with a cooling channel in communication with the oil supply hole, cooling jackets each mounted to a corresponding one of opposite sides of the stator core and configured to fill therein oil passing through the cooling channel, and an end cover mounted to an outer surface portion of the cooling jacket.

Here, opposite end portions of a stator coil wound on the stator core are disposed within the cooling jackets, respectively.

With this structure, by repeating processes such as allowing the oil whose temperature has been decreased through the heat exchange with the heat exchanger to pass through the oil supply hole in the motor housing and then through the cooling channel at the stator core and supplying the oil passed through the cooling channel at the stator core into the cooling jacket to fill the same, the portion of the motor that needs to be cooled (e.g., the stator coil and the stator core) may be cooled by being directly brought into contact with the oil.

In other words, when the oil passes through the cooling channel at the stator core, the stator core is directly cooled by the oil, and the opposite end portions of the stator coil are submerged in the oil filling the cooling jackets, thereby directly cooling the stator coil.

However, the direct motor cooling system has the following problems.

Because the actual shape of the cooling jacket is different from the designed shape thereof, a leak portion through which oil leaks is generated between the cooling jacket and the end cover, and the oil filling the cooling jacket leaks through the leak portion, causing the opposite end portions of the stator coil disposed within the cooling jackets to partially fail to be submerged in the oil.

Moreover, when the opposite end portions of the stator coil partially fail to be submerged in the oil in the cooling jackets, the oil fails to contact some portion of the opposite end portions of the stator coil, rapidly increasing the temperature of the stator coil and damaging the stator coil due to over temperature.

In other words, because the opposite end portions of the stator coil not submerged in the oil in the cooling jackets fail to be cooled, the temperature of the stator coil may be rapidly increased and the stator coil may be damaged due to over temperature.

Furthermore, because the motor controller limits the output of the motor based on the signal from a temperature sensor that detects the rapid temperature rise and over temperature of the stator coil, the vehicle power performance is significantly limited.

The above information disclosed in this background section is only for enhancement of understanding of the background of the present disclosure, and therefore it may contain information that does not form the already known prior art.

SUMMARY

The present disclosure relates to a motor cooling device. Particular embodiments relate to a motor cooling device including cooling jackets, each mounted to a corresponding one of the opposite side portions of a motor housing and having an improved structure capable of cooling a stator coil.

Embodiments of the present disclosure can solve problems associated with the prior art, and an exemplary embodiment of the present disclosure provides a motor cooling device including a motor housing having formed therein an oil supply hole, a stator core provided with a cooling channel in communication with the oil supply hole, and cooling jackets, each mounted to a corresponding one of opposite sides of the stator core and filling therein oil passed through the cooling channel, wherein an upper portion of the cooling jacket provides a spray structure capable of spraying oil toward opposite end portions of a stator coil or a dispersion-inducing structure capable of dispersing oil toward opposite end portions of the stator coil, allowing oil to be brought into contact with opposite end portions of the stator coil not submerged in the oil in the cooling jackets, preventing the opposite end portions of the stator coil from failing to contact the oil to thereby achieve cooling of the stator coil.

An embodiment of the present disclosure provides a motor cooling device. The motor cooling device includes a motor housing having formed therein an oil supply hole, a stator core provided with a cooling channel in communication with the oil supply hole and disposed within the motor housing, a stator coil wound on the stator core, and cooling jackets each having an inner side portion defining therein an oil fill space into which a corresponding one of opposite end portions of the stator coil is inserted, wherein the cooling jackets are tightly coupled to opposite side portions of the motor housing and opposite side portions of the stator core, respectively. Here, an upper portion of the oil fill space in the cooling jacket may provide a spray structure configured to spray oil flowing in from the cooling channel toward a corresponding one of the opposite end portions of the stator coil.

In a preferred embodiment, the spray structure may include an arch-shaped guide plate integrated with the upper portion of the oil fill space in the cooling jacket and configured to guide oil flowing in from the cooling channel in a circumferential direction of the guide plate and oil spray holes formed at predetermined intervals in a length direction of the guide plate and configured to spray oil toward a corresponding one of opposite end portions of the stator coil disposed below the guide plate.

In another preferred embodiment, between an upper surface portion of the guide plate and an inner upper end portion of the cooling jacket, there may be integrated a connection block.

In still another preferred embodiment, an inner side end portion of the guide plate may be tightly brought into contact with an outer side surface of the stator core in a sealable manner.

Another embodiment of the present disclosure provides a motor cooling device. The motor cooling device includes a motor housing having formed therein an oil supply hole, a stator core provided with a cooling channel in communication with the oil supply hole and disposed within the motor housing, a stator coil wound on the stator core, and cooling jackets each having an inner side portion defining therein an oil fill space into which a corresponding one of opposite end portions of the stator coil is inserted, wherein the cooling jackets are tightly coupled to opposite side portions of the motor housing and opposite side portions of the stator core, respectively. Here, an upper portion of the oil fill space in the cooling jacket may provide a dispersion-inducing structure configured to disperse oil flowing in from the cooling channel toward a corresponding one of the opposite end portions of the stator coil.

In a preferred embodiment, the dispersion-inducing structure may include a plurality of oil dispersion plates integrated with the upper portion of the oil fill space in the cooling jacket and configured to disperse oil toward a corresponding one of opposite end portions of the stator coil and an arch-shaped guide plate integrated with the oil dispersion plates and configured to guide oil flowing in from the cooling channel to flow toward the oil dispersion plates.

In another preferred embodiment, the oil dispersion plate may include a pair of inclined plates inclined downward toward a corresponding one of the opposite end portions of the stator coil.

In still another preferred embodiment, between an outer side end portion of the guide plate and an inner wall surface of the oil fill space, there may be provided an oil drop hole configured to allow the oil dispersed by the oil dispersion plate to fall toward a corresponding one of the opposite end portions of the stator coil.

In yet another preferred embodiment, an inner side end portion of the guide plate may be tightly brought into contact with an outer side surface of the stator core in a sealable manner.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of embodiments of the present disclosure are discussed infra.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the present disclosure, and wherein.

Figure 1A:
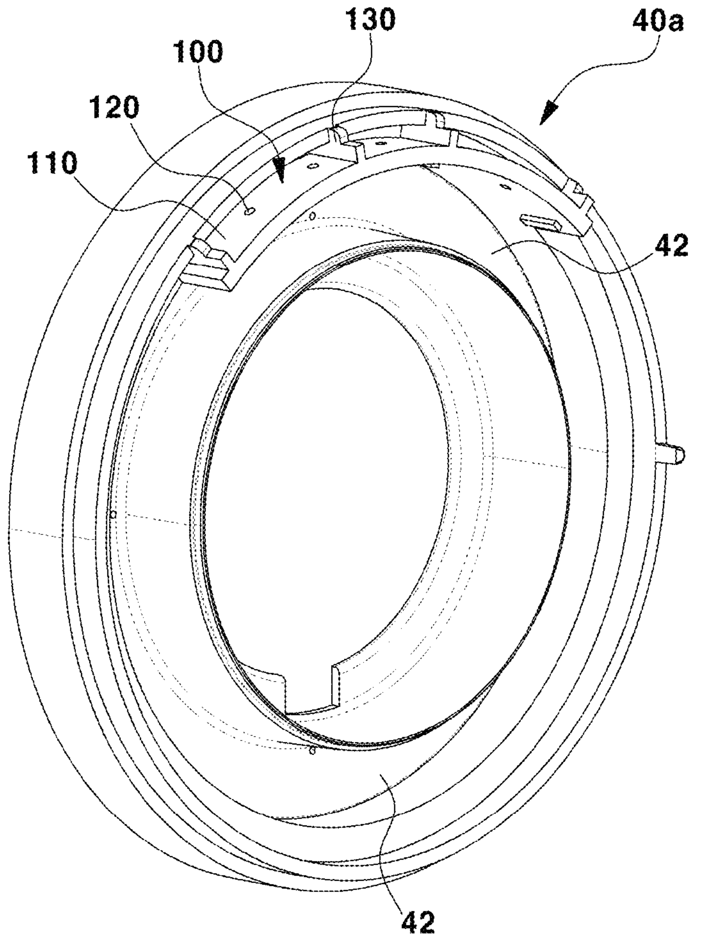
FIG. 1A and FIG. 1B are perspective views each illustrating a cooling jacket, which is one of the components of a motor cooling device according to a first embodiment of the present disclosure.

It should be understood that the appended drawings are not necessarily to scale, presenting a somewhat simplified representation of various preferred features illustrative of the basic principles of embodiments of the present disclosure. The specific design features of the embodiments of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawings.

DETAILED DESCRIPTION OF ILLUSTRATIVE EMBODIMENTS

Descriptions of specific structures or functions presented in the embodiments of the present disclosure are merely exemplary for the purpose of explaining the embodiments according to the concept of the present disclosure, and the embodiments according to the concept of the present disclosure may be implemented in various forms. In addition, the descriptions should not be construed as being limited to the embodiments described herein and should be understood to include all modifications, equivalents, and substitutes falling within the idea and scope of the present disclosure.

In this specification, the terms "first," "second," etc. may be used to describe various components, but the components are not limited to the terms. These terms are only used to distinguish one component from another. For example, a first component could be termed a second component, and similarly, a second component could be termed a first component, without departing from the scope of exemplary embodiments of the present disclosure.

Throughout the specification, like reference numerals indicate like components. The terminology used herein is for the purpose of illustrating embodiments and is not intended to limit the present disclosure. In this specification, the singular form includes plural forms unless specified otherwise. The terms "comprises" and/or "comprising" used in this specification mean that the cited component, step, operation, and/or element does not exclude the presence or addition of one or more of other components, steps, operations, and/or elements.

Hereinafter, preferred embodiments of the present disclosure will be described in detail with reference to the accompanying drawings.

Figure 1B:
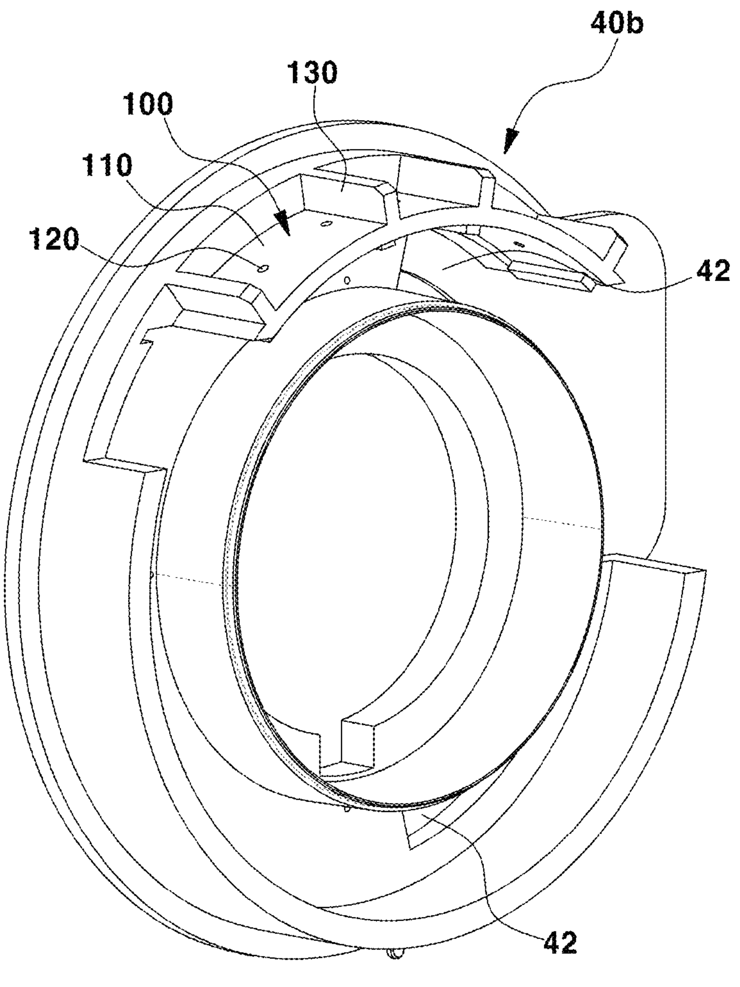
Figure 2:
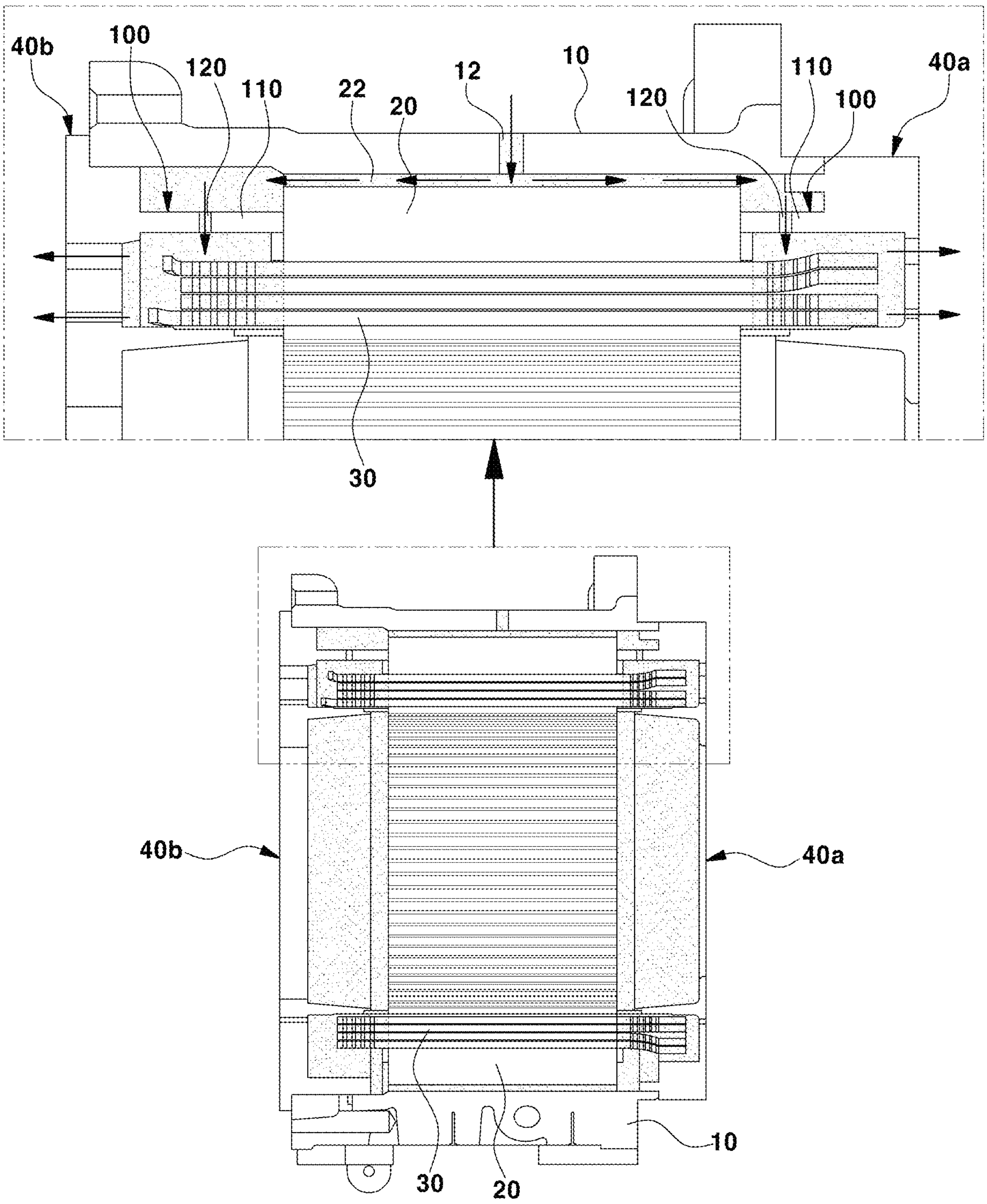
FIG. 2 is a cross-sectional view illustrating the opposite end portions of a stator coil submerged in oil in a state in which the oil fully fills an oil fill space in the cooling jacket, which is one of the components of the motor cooling device according to the first embodiment of the present disclosure.
Figure 3:
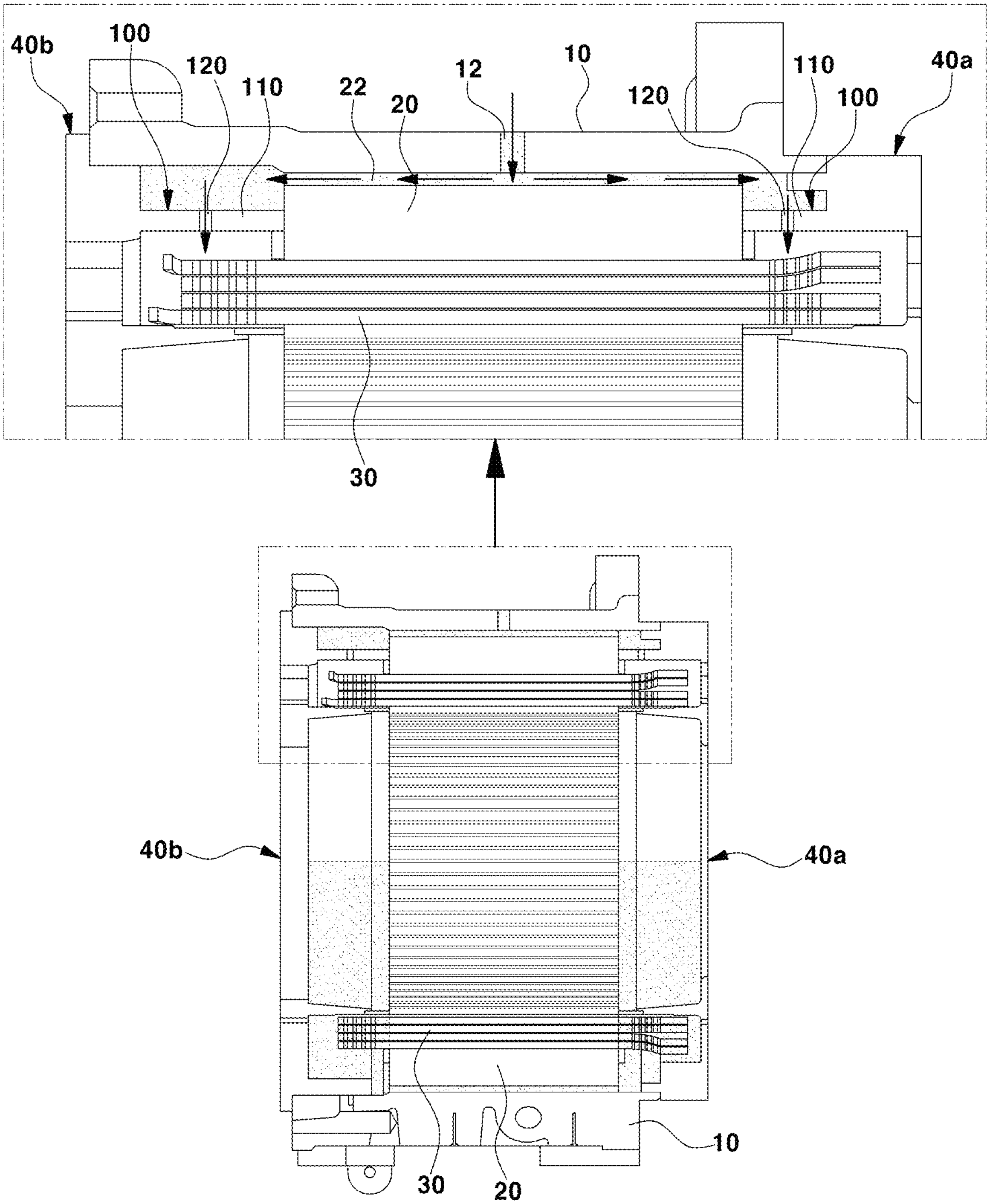
FIG. 3 is a cross-sectional view illustrating the action of oil being sprayed by an oil spray structure of the cooling jacket, which is one of the components of the motor cooling device according to the first embodiment of the present disclosure, onto opposite end portions of the stator coil that are not submerged in oil in a state in which the oil filling the oil fill space in the cooling jacket is partially leaked.

FIG. 1A and FIG. 1B are perspective views each illustrating a cooling jacket, which is one of the components of a motor cooling device according to a first embodiment of the present disclosure, and FIG. 2 and FIG. 3 are cross-sectional views each illustrating the motor cooling device according to the first embodiment of the present disclosure.

The motor cooling device according to the first embodiment of the present disclosure includes, as illustrated in FIG. 2 and FIG. 3, a motor housing 10 having formed therein an oil supply hole 12, a stator core 20 provided with a cooling channel 22 in communication with the oil supply hole 12 and disposed within the motor housing 10, a stator coil 30 wound on the stator core 20, and cooling jackets 40*a*, 40*b* each being tightly coupled to a corresponding one of opposite side portions of the motor housing 10 and a corresponding one of opposite side portions of the stator core 20.

Preferably, a mid-housing (not shown) in which a rotation shaft of the motor is installed may be coupled to an outer side portion of the cooling jacket 40*a*, and an end cover (not shown), which is a type of finishing material, may be mounted on the outer side portion of the cooling jacket 40*b*.

Each of the cooling jackets 40*a*, 40*b* has a circular ring shape and has an inner side portion defining therein an oil fill space 42 into which a corresponding one of two end coil portions, which are the opposite end portions of the stator coil 30, is inserted to enable oil contact. Here, the cooling jacket 40*a* is mounted to a front portion of the motor housing 10, and the cooling jacket 40*b* is mounted to a rear portion of the motor housing 10.

Because the front portion and the rear portion of the motor housing 10 are different in shape, the external shapes of the cooling jacket 40*a* and the cooling jacket 40*b* may be somewhat different from each other. However, the cooling jacket 40*a* and the cooling jacket 40*b* commonly have a structure defining therein the oil fill space 42 into which a corresponding one of the end coil portions, which are the opposite end portions of the stator coil 30, is inserted to enable oil contact.

According to the first embodiment of the present disclosure, an upper portion of the oil fill space 42 in the cooling jacket 40*a*, 40*b* provides a spray structure 100 configured to spray oil flowing in from the cooling channel 22 at the stator core 20 toward a corresponding one of the opposite end portions of the stator coil 30.

Specifically, the spray structure 100 includes, as illustrated in FIG. 1A and FIG. 1B, an arch-shaped guide plate 110 integrated with the upper portion of the oil fill space 42 in the cooling jacket 40*a*, 40*b* and configured to guide oil flowing in from the cooling channel 22 at the stator core 20 in a circumferential direction and oil spray holes 120 formed at predetermined intervals in the length direction of the guide plate 110 and configured to spray oil toward a corresponding one of the opposite end portions of the stator coil 30 disposed below the guide plate 110.

Moreover, a connection block 130 is integrated between an upper surface portion of the guide plate 110 and an inner upper end portion of the cooling jacket 40*a*, 40*b*, allowing the guide plate 110 to be integrated with the upper portion of the oil fill space 42 in the cooling jacket 40*a*, 40*b*.

Here, an inner side end portion of the guide plate 110 is tightly brought into contact with an outer side surface of the stator core 20 in a sealable manner, blocking oil flowing in from the cooling channel 22 at the stator core 20 from flowing along an outer side wall portion of the stator core 20 and inducing the oil to fall onto the upper surface portion of the guide plate 110 and flow in the circumferential direction.

Here, an operation flow of the motor cooling device according to the first embodiment of the present disclosure is as follows.

First, oil pumped from an electric oil pump (not shown) exchanges heat with a heat exchanger (not shown), and the oil whose temperature has decreased through heat exchange with the heat exchanger enters the oil supply hole 12 in the motor housing 10.

Thereafter, the oil that entered the oil supply hole 12 in the motor housing 10 passes through the cooling channel 22 at the stator core 20 and then fills the oil fill space 42 in the cooling jacket 40*a*, 40*b*.

Referring to FIG. 2, when oil does not leak from the cooling jacket 40*a*, 40*b*, the oil may fully fill the oil fill space 42 in the cooling jacket 40*a*, 40*b*, allowing the end coil portions, which are the opposite end portions of the stator coil 30, to be submerged in the oil filling the oil fill space 42 to thereby facilitate cooling of the stator coil 30.

In other words, when the oil passes through the cooling channel 22 at the stator core 20, the stator core 20 may be directly cooled by the oil, and the opposite end portions of the stator coil 30 are submerged in the oil filling the oil fill space 42 in the cooling jacket 40*a*, 40*b*, allowing the stator coil 30 to be directly cooled by the oil.

Meanwhile, by repeating processes such as discharging the oil filling the oil fill space 42 in the cooling jacket 40*a*, 40*b* to the electric oil pump by the operation of the electric oil pump, performing heat exchange between the oil pumped from the electric oil pump and the heat exchanger, and allowing the oil whose temperature has been decreased through the heat exchange with the heat exchanger to enter the oil supply hole 12 in the motor housing 10, the oil fill space 42 in the cooling jacket 40*a*, 40*b* may be kept filled with oil as long as there is no oil leakage.

Conversely, when oil leaks from the cooling jackets 40*a*, 40*b*, the amount of oil filling the oil fill space 42 in the cooling jackets 40*a*, 40*b* may decrease, and accordingly, as illustrated in FIG. 3, an upper space of the oil fill space 42 may be empty without oil.

Moreover, when the upper space of the oil fill space 42 in the cooling jacket 40*a*, 40*b* is empty without oil, the opposite end portions of the stator coil 30 disposed at the upper space are not submerged in oil.

As such, when the opposite end portions of the stator coil 30 disposed at the upper space are not submerged in oil and fail to contact the oil, the temperature of the stator coil may increase rapidly and the stator coil may be damaged due to over temperature.

In the first embodiment of the present disclosure to prevent said problem, even though oil leaks from the cooling jackets 40*a*, 40*b*, the oil is spread toward the opposite end portions of the stator coil 30 disposed at the upper space (the portion not submerged in oil), smoothly cooling the opposite end portions of the stator coil 30 disposed at the upper space.

To this end, processes of performing heat exchange between the oil pumped from the electric oil pump and the heat exchanger (not shown), allowing the oil whose temperature has been decreased through the heat exchange with the heat exchanger to enter the oil supply hole 12 in the motor housing 10, and allowing the oil that entered the oil supply hole 12 in the motor housing 10 to flow through the cooling channel 22 at the stator core 20 are performed first, and then the oil is allowed to flow into the upper surface portion of the guide plate 110 of the spray structure 100 from the cooling channel 22.

Thereafter, the oil that flows into the upper surface portion of the guide plate 110 from the cooling channel 22 at the stator core 20 flows in the circumferential direction.

In other words, because the guide plate 110 has an arch shape, the oil that flows in from the cooling channel 22 flows in the circumferential direction of the upper surface portion of the guide plate 110.

Here, the inner side end portion of the guide plate 110 is tightly brought into contact with the outer side surface of the stator core 20 in a sealable manner, blocking oil flowing in from the cooling channel 22 at the stator core 20 from flowing along the outer side wall surface of the stator core 20 and inducing the oil to fall onto the upper surface portion of the guide plate 110 and flow in the circumferential direction.

Subsequently, the oil that flows in the circumferential direction of the upper surface portion of the guide plate 110 is, as illustrated in FIG. 3, sprayed toward the opposite end portions of the stator coil 30 disposed below the guide plate 110 through the plurality of oil spray holes 120 formed in the guide plate 110.

To reiterate, the oil may be sprayed through the plurality of oil spray holes 120 toward the opposite end portions of the stator coil 30 disposed below the guide plate 110, i.e., the opposite end portions of the stator coil 30 disposed at the upper space (the portion not submerged in oil).

Therefore, even though oil leaks from the cooling jackets 40*a*, 40*b*, the oil sprayed through the plurality of oil spray holes 120 is brought into contact with the opposite end portions of the stator coil 30 disposed at the upper space (the portion not submerged in oil), smoothly cooling the opposite end portions of the stator coil 30 disposed at the upper space.

Here, the oil brought into contact with and to cool the opposite end portions of the stator coil 30 disposed at the upper space falls to fill a lower space of the oil fill space 42 in the cooling jackets 40*a*, 40*b*.

Meanwhile, processes such as discharging the oil filling the lower space of the oil fill space 42 in the cooling jacket 40*a*, 40*b* to the electric oil pump by the operation of the electric oil pump, performing heat exchange between the oil pumped from the electric oil pump and the heat exchanger, allowing the oil whose temperature has been decreased through the heat exchange with the heat exchanger to sequentially pass the oil supply hole 12 in the motor housing 10 and the cooling channel 22 at the stator core 20, allowing the oil to flow into the upper surface portion of the guide plate 110 from the cooling channel 22, and spraying the oil to the opposite end portions of the stator coil 30 disposed at the upper space through the plurality of oil spray holes 120 may be repeated.

According to the first embodiment of the present disclosure, even though oil leaks from the cooling jackets 40*a*, 40*b* and the opposite end portions of the stator coil 30 disposed at the upper space fail to contact the oil, oil sprayed through the plurality of oil spray holes 120 is brought into contact with the opposite end portions of the stator coil 30 disposed at the upper space (the portion not submerged in oil), smoothly achieving oil cooling for the opposite end portions of the stator coil 30 disposed at the upper space.

Figure 4A:
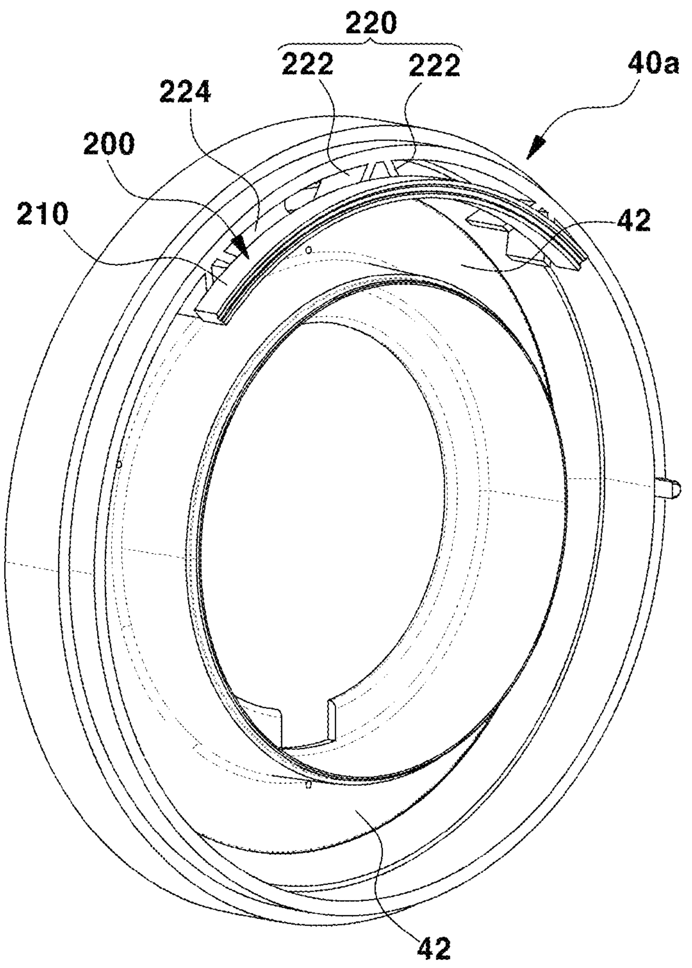
FIG. 4A and FIG. 4B are perspective views each illustrating a cooling jacket, which is one of the components of a motor cooling device according to a second embodiment of the present disclosure.
Figure 4B:
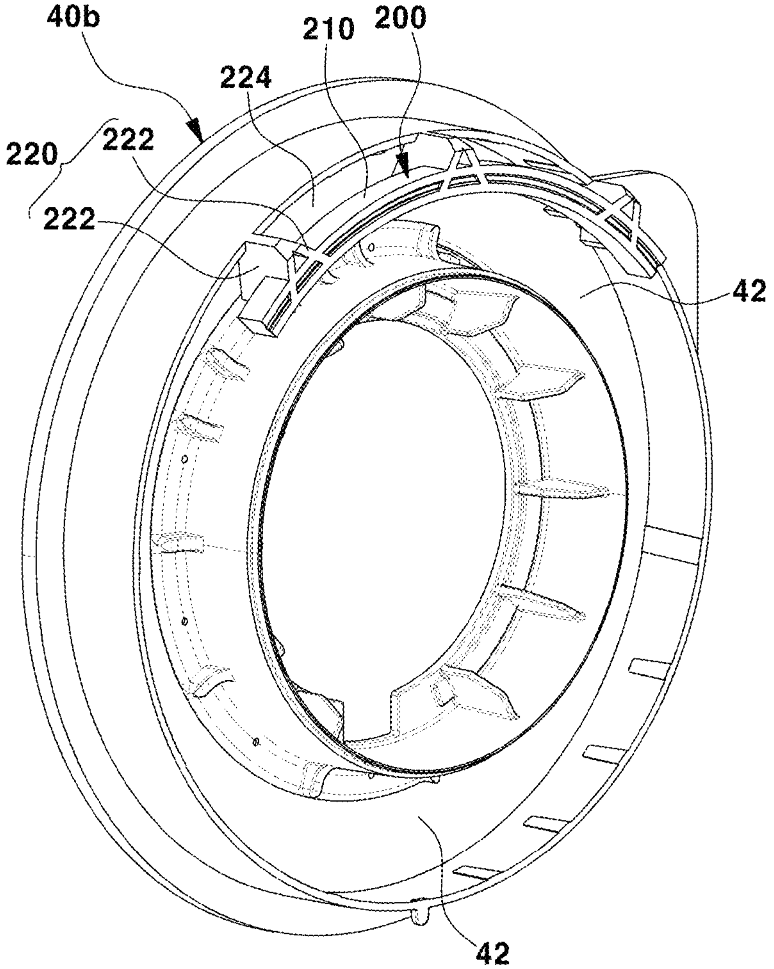
Figure 5:
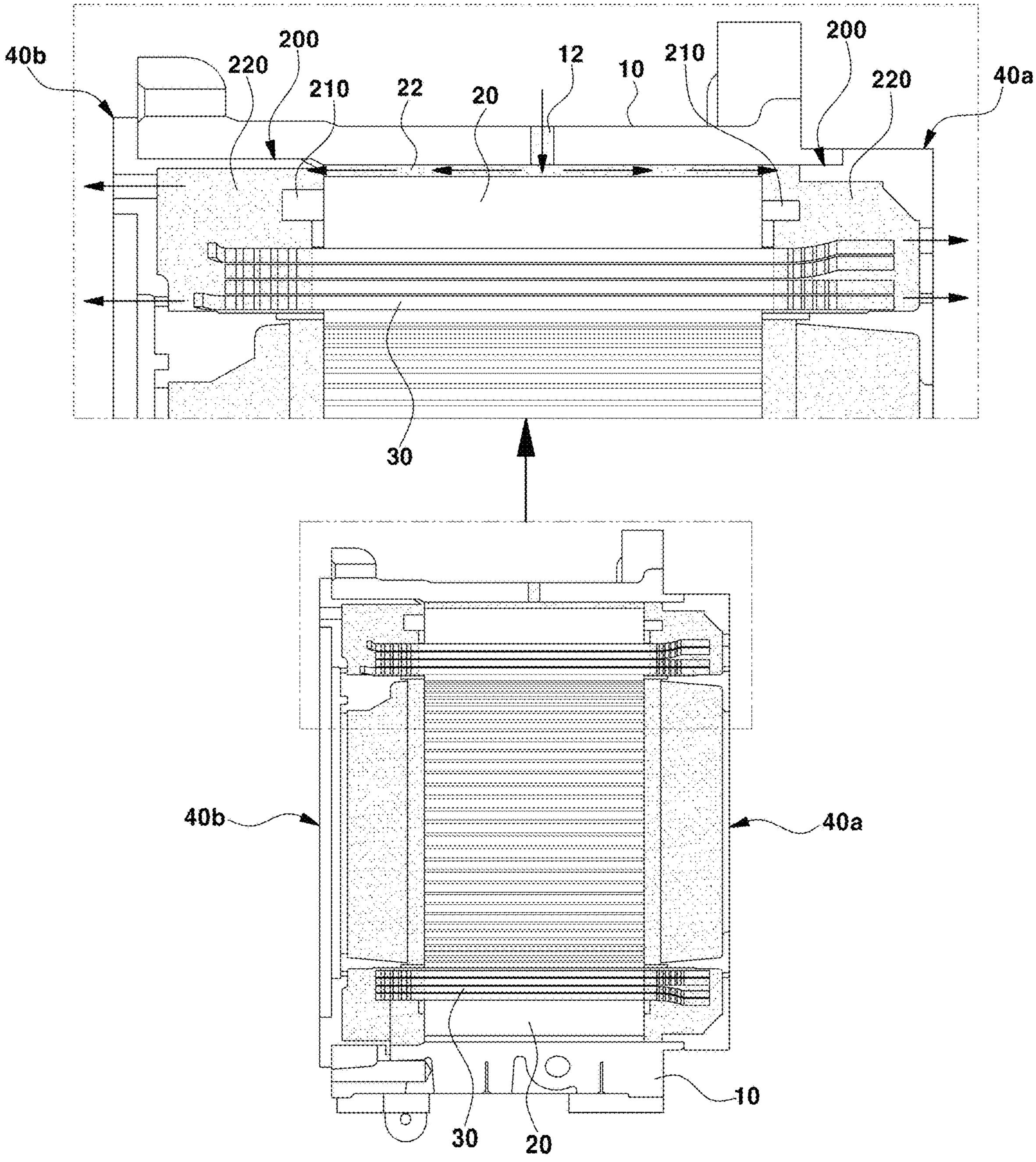
FIG. 5 is a cross-sectional view illustrating the opposite end portions of a stator coil submerged in oil in a state in which the oil fully fills an oil fill space in the cooling jacket, which is one of the components of the motor cooling device according to the second embodiment of the present disclosure.
Figure 6:
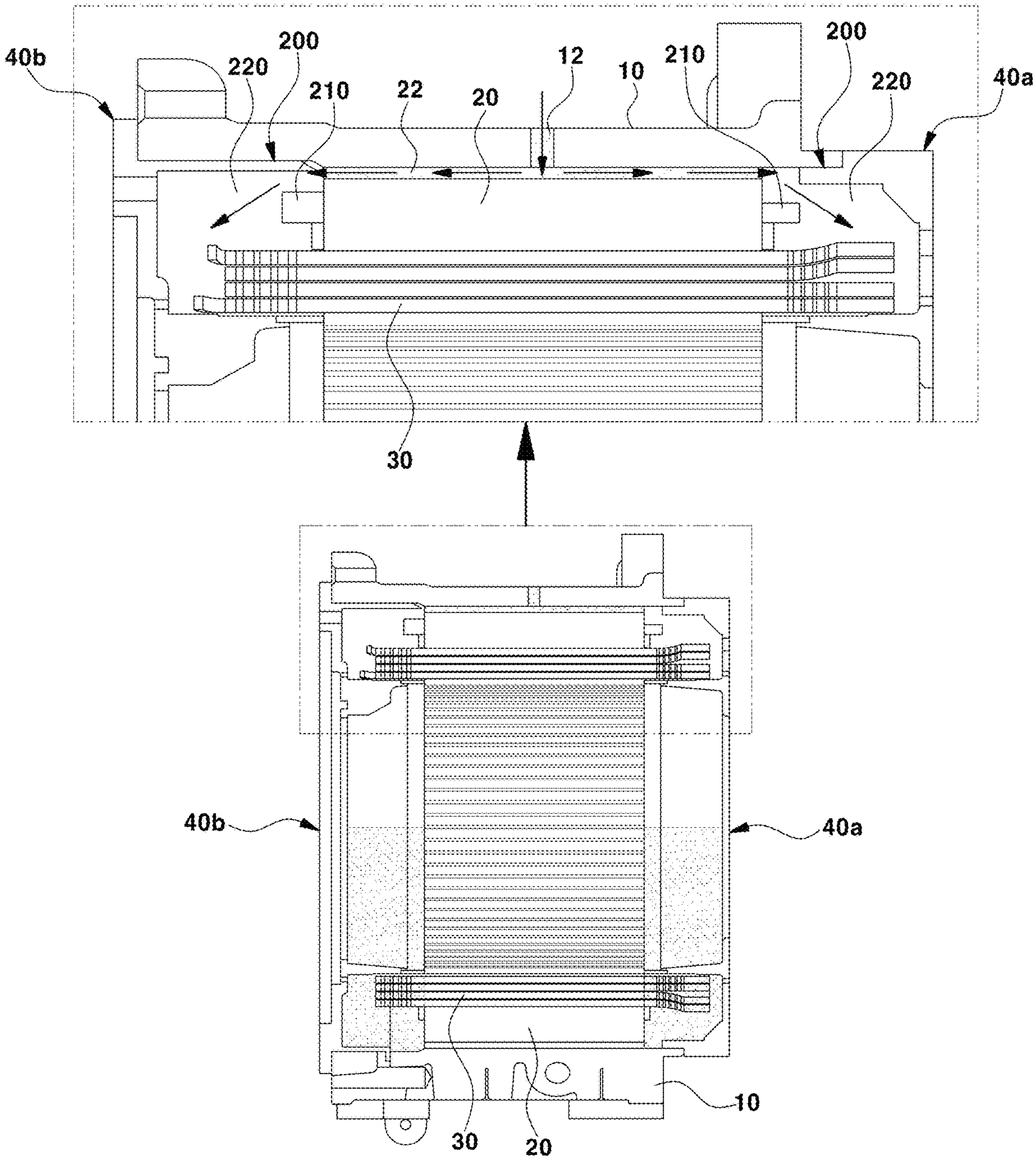
FIG. 6 is a cross-sectional view illustrating the action of oil being sprayed by an oil spray structure of the cooling jacket, which is one of the components of the motor cooling device according to the second embodiment of the present disclosure, onto opposite end portions of the stator coil that are not submerged in oil in a state in which the oil filling the oil fill space in the cooling jacket is partially leaked.

FIG. 4A and FIG. 4B are perspective views each illustrating a cooling jacket, which is one of the components of a motor cooling device according to a second embodiment of the present disclosure, and FIG. 5 and FIG. 6 are cross-sectional views each illustrating the motor cooling device according to the second embodiment of the present disclosure.

The motor cooling device according to the second embodiment of the present disclosure includes, as illustrated in FIG. 5 and FIG. 6, a motor housing 10 having formed therein an oil supply hole 12, a stator core 20 provided with a cooling channel 22 in communication with the oil supply hole 12 and disposed within the motor housing 10, a stator coil 30 wound on the stator core 20, and cooling jackets 40*a*, 40*b* each being tightly coupled to a corresponding one of opposite side portions of the motor housing 10 and a corresponding one of opposite side portions of the stator core 20.

Preferably, a mid-housing (not shown) in which a rotation shaft of the motor is installed may be coupled to an outer side portion of the cooling jacket 40*a*, and an end cover (not shown), which is a type of finishing material, may be mounted on the outer side portion of the cooling jacket 40*b*.

Each of the cooling jackets 40*a*, 40*b* has a circular ring shape and has an inner side portion defining therein an oil fill space 42 into which a corresponding one of two end coil portions, which are the opposite end portions of the stator coil 30, is inserted to enable oil contact. Here, the cooling jacket 40*a* is mounted to a front portion of the motor housing 10, and the cooling jacket 40*b* is mounted to a rear portion of the motor housing 10.

Because the front portion and the rear portion of the motor housing 10 are different in shape, the external shapes of the cooling jacket 40*a* and the cooling jacket 40*b* may be somewhat different from each other. However, the cooling jacket 40*a* and the cooling jacket 40*b* commonly have a structure defining therein the oil fill space 42 into which a corresponding one of the end coil portions, which are the opposite end portions of the stator coil 30, is inserted to enable oil contact.

According to the second embodiment of the present disclosure, an upper portion of the oil fill space 42 in the cooling jacket 40*a*, 40*b* provides a dispersion-inducing structure 200 configured to disperse oil flowing in from the cooling channel 22 at the stator core 20 toward a corresponding one of the opposite end portions of the stator coil 30.

Specifically, the dispersion-inducing structure 200 includes, as illustrated in FIG. 4A and FIG. 4B, a plurality of oil dispersion plates 220 integrated with the upper portion of the oil fill space 42 in the cooling jacket 40*a*, 40*b* and configured to disperse oil toward a corresponding one of the opposite end portions of the stator coil 30 and an arch-shaped guide plate 210 integrated with the oil dispersion plates 220 and configured to guide oil flowing in from the cooling channel 22 at the stator core 20 to flow toward the oil dispersion plates 220.

Preferably, the oil dispersion plate 220 may include a pair of inclined plates 222 inclined downward toward a corresponding one of the opposite end portions of the stator coil 30 arranged below the oil dispersion plate 220.

Moreover, between the outer side end portion of the guide plate 210 and the inner wall surface of the oil fill space 42 in the cooling jackets 40*a*, 40*b*, an oil drop hole 224 configured to allow the oil dispersed by the oil dispersion plate 220 to disperse and fall toward a corresponding one of the opposite end portions of the stator coil 30 is provided.

Here, an inner side end portion of the guide plate 210 is tightly brought into contact with an outer side surface of the stator core 20 in a sealable manner, blocking oil flowing in from the cooling channel 22 at the stator core 20 from flowing along an outer side wall portion of the stator core 20 and inducing the oil to fall onto the upper surface portion of the guide plate 210 to flow in the circumferential direction and toward the oil dispersion plate 220.

Here, an operation flow of the motor cooling device according to the second embodiment of the present disclosure is as follows.

First, oil pumped from an electric oil pump (not shown) exchanges heat with a heat exchanger (not shown), and the oil whose temperature has decreased through heat exchange with the heat exchanger enters the oil supply hole 12 in the motor housing 10.

Thereafter, the oil that entered the oil supply hole 12 in the motor housing 10 passes through the cooling channel 22 at the stator core 20 and then fills the oil fill space 42 in the cooling jacket 40*a*, 40*b*.

Referring to FIG. 5, when oil does not leak from the cooling jacket 40*a*, 40*b*, the oil may fully fill the oil fill space 42 in the cooling jacket 40*a*, 40*b*, allowing the end coil portions, which are the opposite end portions of the stator coil 30, to be submerged in the oil filling the oil fill space 42 to thereby facilitate cooling of the stator coil 30.

In other words, when the oil passes through the cooling channel 22 at the stator core 20, the stator core 20 may be directly cooled by the oil, and the opposite end portions of the stator coil 30 are submerged in the oil filling the oil fill space 42 in the cooling jacket 40*a*, 40*b*, allowing the stator coil 30 to be directly cooled by the oil.

Meanwhile, by repeating processes such as discharging the oil filling the oil fill space 42 in the cooling jacket 40*a*, 40*b* to the electric oil pump by the operation of the electric oil pump, performing heat exchange between the oil pumped from the electric oil pump and the heat exchanger, and allowing the oil whose temperature has been decreased through the heat exchange with the heat exchanger to enter the oil supply hole 12 in the motor housing 10, the oil fill space 42 in the cooling jacket 40*a*, 40*b* may be kept filled with oil as long as there is no oil leakage.

Conversely, when oil leaks from the cooling jackets 40*a*, 40*b*, the amount of oil filling the oil fill space 42 in the cooling jackets 40*a*, 40*b* may decrease, and accordingly, as illustrated in FIG. 6, an upper space of the oil fill space 42 may be empty without oil.

Moreover, when the upper space of the oil fill space 42 in the cooling jacket 40*a*, 40*b* is empty without oil, the opposite end portions of the stator coil 30 disposed at the upper space are not submerged in oil.

As such, when the opposite end portions of the stator coil 30 disposed at the upper space are not submerged in oil and fail to contact the oil, the temperature of the stator coil may increase rapidly and the stator coil may be damaged due to over temperature.

In the second embodiment of the present disclosure, to prevent said problem, even though oil leaks from the cooling jackets 40*a*, 40*b*, the oil is dispersed toward the opposite end portions of the stator coil 30 disposed at the upper space (the portion not submerged in oil), smoothly cooling the opposite end portions of the stator coil 30 disposed at the upper space.

To this end, processes of performing heat exchange between the oil pumped from the electric oil pump and the heat exchanger (not shown), allowing the oil whose temperature has been decreased through the heat exchange with the heat exchanger to enter the oil supply hole 12 in the motor housing 10, and allowing the oil that entered the oil supply hole 12 in the motor housing 10 to flow through the cooling channel 22 at the stator core 20 are performed first, and then the oil is allowed to flow into the upper surface portion of the arch-shaped guide plate 210 of the dispersion-inducing structure 200 from the cooling channel 22.

Thereafter, the oil that flows into the upper surface portion of the guide plate 210 from the cooling channel 22 flows in the circumferential direction and flows toward the plurality of oil dispersion plates 220 at the same time.

In other words, because the guide plate 210 has an arch shape, the oil that flows in from the cooling channel 22 flows in the circumferential direction of the upper surface portion of the guide plate 210 and flows toward the plurality of oil dispersion plates 220 at the same time.

Here, the inner side end portion of the guide plate 210 is tightly brought into contact with the outer side surface of the stator core 20 in a sealable manner, blocking oil flowing in from the cooling channel 22 at the stator core 20 from flowing along the outer side wall surface of the stator core 20 and inducing the oil to fall onto the upper surface portion of the guide plate 210 and flow in the circumferential direction and toward the oil dispersion plate 220.

Subsequently, the oil that falls onto the upper surface portion of the guide plate 210 from the cooling channel 22 and flows toward the oil dispersion plates 220 is, as illustrated in FIG. 6, dispersed downward along the pair of inclined plates 222 constituting the oil dispersion plate 220 and falls through the oil drop hole 224.

To reiterate, because the oil falls while being dispersed toward the opposite end portions of the stator coil 30 disposed below the guide plate 210 and the oil dispersion plate 220, the oil may be brought into contact with the opposite end portions of the stator coil 30 inserted into the upper space of the oil fill space, i.e., the opposite end portions of the stator coil 30 disposed at the upper space (the portion not submerged in oil).

Therefore, even though oil leaks from the cooling jackets 40*a*, 40*b*, the oil dispersed by the plurality of oil dispersion plates 220 is evenly brought into contact with the opposite end portions of the stator coil 30 disposed at the upper space (the portion not submerged in oil), smoothly cooling the opposite end portions of the stator coil 30 disposed at the upper space.

Here, the oil brought into contact with and to cool the opposite end portions of the stator coil 30 disposed at the upper space falls to fill a lower space of the oil fill space 42 in the cooling jackets 40*a*, 40*b*.

Meanwhile, processes such as discharging the oil filling the lower space of the oil fill space 42 in the cooling jacket 40*a*, 40*b* to the electric oil pump by the operation of the electric oil pump, performing heat exchange between the oil pumped from the electric oil pump and the heat exchanger, allowing the oil whose temperature has been decreased through the heat exchange with the heat exchanger to sequentially pass the oil supply hole 12 in the motor housing 10 and the cooling channel 22 at the stator core 20, allowing the oil to flow into the upper surface portion of the guide plate 210 from the cooling channel 22, and guiding the oil to be dispersed to the opposite end portions of the stator coil 30 disposed at the upper space through the plurality of oil dispersion plates 220 may be repeated.

According to the second embodiment of the present disclosure, even though oil leaks from the cooling jackets 40*a*, 40*b* and the opposite end portions of the stator coil 30 disposed at the upper space fail to contact the oil, oil dispersed by the plurality of oil dispersion plates 220 is brought into contact with the opposite end portions of the stator coil 30 disposed at the upper space (the portion not submerged in oil), smoothly achieving oil cooling for the opposite end portions of the stator coil 30 disposed at the upper space.

As is apparent from the above description, embodiments of the present disclosure may provide the following effects.

First, by providing a spray structure capable of evenly spraying oil toward the opposite end portions of a stator coil or a dispersion-inducing structure capable of evenly dispersing oil toward the opposite end portions of the stator coil at an upper portion of an oil fill space in a cooling jacket, oil may be evenly brought into contact with the opposite end portions of the stator coil that are not submerged in oil in the oil fill space in the cooling jacket, cooling the opposite end portions of the stator coil not submerged in oil even in the event of oil leakage to thereby stably achieve a desired cooling performance for a motor.

Second, not only the opposite end portions of the stator coil submerged in the oil in the oil fill space in the cooling jacket but also the opposite end portions of the stator coil not submerged in the oil in the oil fill space in the cooling jacket may be cooled by oil, preventing the temperature of the stator coil from rapidly increasing and the stator coil from being damaged due to over temperature.

Third, it is possible to prevent a motor controller from limiting the motor output based on the signal from a temperature sensor that detects a rapid temperature rise and over temperature of the stator coil, improving vehicle travelling performance and marketability.

Although embodiments of the present disclosure have been described in detail with reference to various embodiments, the scope of the present disclosure is not limited to the above-described embodiments, and various modifications and improvements by those skilled in the art based on the basic concepts of the present disclosure as defined in the claims below will also be included in the scope of the present disclosure.

What is claimed is:

1. A device for cooling a motor, the device comprising:
a motor housing comprising an oil supply hole;
a stator core disposed within the motor housing and comprising a cooling channel in communication with the oil supply hole;
a stator coil wound on the stator core;
cooling jackets each having an inner side portion defining therein an oil fill space into which a corresponding one of opposite end portions of the stator coil is inserted, wherein the cooling jackets are tightly coupled to opposite side portions of the motor housing and opposite side portions of the stator core, respectively; and
spray structures respectively disposed in upper portions of the oil fill spaces in the cooling jackets, each spray structure being configured to spray oil flowing into the spray structure from the cooling channel toward the corresponding one of the opposite end portions of the stator coil.

2. The device of claim 1, wherein each of the spray structures comprises:
an arch-shaped guide plate integrated with the upper portion of the oil fill space in the cooling jacket and configured to guide the oil flowing in from the cooling channel in a circumferential direction of the guide plate; and
oil spray holes disposed at predetermined intervals in a length direction of the guide plate and configured to spray the oil toward the corresponding one of the opposite end portions of the stator coil disposed below the guide plate.

3. The device of claim 2, further comprising a connection block integrated between an upper surface portion of the guide plate and an inner upper end portion of the cooling jacket.

4. The device of claim 2, wherein an inner side end portion of the guide plate is tightly brought into contact with an outer side surface of the stator core in a sealable manner.

5. The device of claim 2, wherein the device is configured to receive the oil through the oil supply hole in the motor housing, pass the oil through the cooling channel of the stator core, and fill the oil fill space of the cooling jackets with the oil.

6. The device of claim 5, wherein, in a case in which the oil is not filled in the upper portions of the oil fill spaces in the cooling jackets, the device is configured to flow the oil into an upper surface portion of the guide plate in the circumferential direction of the guide plate such that the oil is sprayed through the oil spray holes toward the corresponding one of the opposite end portions of the stator core disposed below the guide plate.

7. The device of claim 1, wherein each of the cooling jackets has a circular ring shape.

8. A device for cooling a motor, the device comprising:
a motor housing comprising an oil supply hole;

a stator core disposed within the motor housing and comprising a cooling channel in communication with the oil supply hole;

a stator coil wound on the stator core;

cooling jackets each having an inner side portion defining therein an oil fill space into which a corresponding one of opposite end portions of the stator coil is inserted, wherein the cooling jackets are tightly coupled to opposite side portions of the motor housing and opposite side portions of the stator core, respectively; and dispersion-inducing structures respectively disposed in upper portions of the oil fill spaces in the cooling jackets, the dispersion-inducing structures being configured to disperse oil flowing in from the cooling channel toward the corresponding one of the opposite end portions of the stator coil.

9. The device of claim 8, wherein each of the dispersion-inducing structures comprises:

a plurality of oil dispersion plates integrated with the upper portion of the oil fill space in the cooling jacket and configured to disperse the oil toward the corresponding one of the opposite end portions of the stator coil; and an arch-shaped guide plate integrated with the oil dispersion plates and configured to guide the oil flowing in from the cooling channel to flow toward the oil dispersion plates.

10. The device of claim 9, wherein the oil dispersion plates comprise a pair of inclined plates inclined downward toward the corresponding one of the opposite end portions of the stator coil.

11. The device of claim 9, further comprising an oil drop hole disposed between an outer side end portion of the guide plate and an inner wall surface of the oil fill space, the oil drop hole being configured to allow the oil dispersed by the oil dispersion plates to fall toward the corresponding one of the opposite end portions of the stator coil.

12. The device of claim 9, wherein an inner side end portion of the guide plate is tightly brought into contact with an outer side surface of the stator core in a sealable manner.

13. The device of claim 9, wherein the device is configured to receive the oil through the oil supply hole in the motor housing, pass the oil through the cooling channel of the stator core, and fill the oil fill space of the cooling jackets with the oil.

14. The device of claim 13, wherein, in a case in which the oil is not filled in the upper portions of the oil fill spaces in the cooling jackets, the device is configured to flow the oil into an upper surface portion of the guide plate in a circumferential direction of the guide plate such that the oil flows toward the oil dispersion plates at a same time and is dispersed along the oil dispersion plates toward the opposite end portions of the stator coil disposed below the guide plate.

15. The device of claim 8, wherein each of the cooling jackets has a circular ring shape.

* * * * *